(12) United States Patent
Kormann

(10) Patent No.: US 6,978,588 B2
(45) Date of Patent: Dec. 27, 2005

(54) HARVESTING MACHINE

(75) Inventor: Georg Kormann, Homburg (DE)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/867,932

(22) Filed: Jun. 14, 2004

(65) Prior Publication Data

US 2004/0255565 A1 Dec. 23, 2004

(30) Foreign Application Priority Data

Jun. 12, 2003 (DE) .............................. 103 26 367

(51) Int. Cl.⁷ ............................................ A01D 34/03
(52) U.S. Cl. ....................................... 56/13.5; 56/208
(58) Field of Search .............................. 56/13.5, 16.6, 56/208

(56) References Cited

U.S. PATENT DOCUMENTS

| 2,827,749 | A | * | 3/1958 | Patten ........................... 56/128 |
| 3,651,624 | A | * | 3/1972 | Bandemer ...................... 56/28 |
| 4,078,626 | A | * | 3/1978 | Weichel ....................... 111/131 |
| 4,554,750 | A | * | 11/1985 | Jamsa ............................. 37/3 |
| 5,176,573 | A | * | 1/1993 | Dow ........................... 460/42 |
| 5,381,646 | A | * | 1/1995 | Casey et al. ................. 56/13.1 |
| 6,484,485 | B2 | * | 11/2002 | Dillon ......................... 56/14.6 |

FOREIGN PATENT DOCUMENTS

| AT | DE 1 172 465 | 6/1963 |
| DE | 2874374 | 11/1968 |
| DE | 33 10 682 | 11/1984 |
| DE | 199 53 380 | 10/2000 |
| EP | 1 277 395 A | 1/2003 |
| GB | 773 208 | 4/1957 |
| WO | WO 2004/002210 | 1/2004 |

OTHER PUBLICATIONS

Champion Forage Harvesters, *Industrially Built For Kind Size Field Performance*, Champion Products, Inc., 2 Pages.

* cited by examiner

Primary Examiner—Thomas B. Will
Assistant Examiner—Alicia Torres

(57) ABSTRACT

A high-capacity harvesting machine includes a first harvested crop take-up arrangement attached to the front of the harvesting machine and a first harvested crop processing arrangement arranged within the harvesting machine to which crop harvested by the first harvested crop take-up arrangement can be conveyed. A second harvested crop take-up arrangement is provided that is separated by a space from the first harvested crop take-up arrangement arranged offset to the side and to the rear in the direction of operation from the first harvested crop take-up arrangement, and the crop harvested by the second harvested crop take-up arrangement can be conveyed to the second harvested crop processing arrangement arranged within the harvesting machine. In the case where the crop processing arrangements are choppers, there is provided a central discharge arrangement to which the crop from both processing arrangements can be conveyed.

4 Claims, 2 Drawing Sheets

HARVESTING MACHINE

FIELD OF THE INVENTION

The invention concerns a harvesting machine with a first harvested crop take-up arrangement attached to the front of the harvesting machine and a first harvested crop processing arrangement arranged within the harvesting machine, to which harvested crop harvested by the first harvested crop take-up arrangement can be conducted.

BACKGROUND OF THE INVENTION

In the state of the art, forage harvesters are equipped with a single knife drum and a single intake channel, that conducts harvested crop to the knife drum. In known forage harvesters the possible throughput performance is restricted on the basis of legal limitations of the height of the configuration and the width of the configuration. Furthermore, the conventional configuration of forage harvesters leads to a shift of the center of gravity of the mass towards the forward region of the machine, that degrades the operating performance particularly at higher speeds.

EP 1 277 395 A proposes that the flow of harvested crop taken up is to be divided into two partial streams in order to increase the performance and to conduct these to one or more chopper drums. Although this measure removes a restriction in the inlet channel, the machine remains nose heavy.

The problem underlying the invention is seen in the need to make available a harvesting machine, in particular a forage harvester, that permits a high crop throughput and is provided with an improved operating performance, while preserving its good processing qualities.

SUMMARY OF THE INVENTION

According to the present invention, there is provided an improved harvesting machine for permitting a high crop throughput.

An object of the invention is to provide a harvesting machine having two separate crop take-up arrangements, with one arrangement being located at the front of the harvester and the other at the rear and offset relative to the front take-up arrangement.

The object is accomplished by providing a self-propelled harvesting machine with a first harvested crop take-up arrangement that takes up harvested crop or harvests it from the field. The harvested crop is conducted to a harvested crop processing arrangement, that is located within the harvesting machine. It is proposed that a second harvested crop take-up arrangement be attached to the harvesting machine that is offset to the outside in the sideways direction and to the rear in the direction of operation relative to the first harvested crop take-up arrangement. A second crop conveying unit takes over the crop taken up or harvested of by the second harvested crop take-up arrangement and conducts it to a harvested crop processing arrangement within the harvesting machine. As a rule a harvested crop take-up arrangement is provided on each side of the harvesting machine.

In this way, the result is that several elements of the harvesting machine are offset further to the rear in the direction of operation. This results in a more uniform weight distribution and a center of gravity located further to the rear, which decisively improves the operating performance. Moreover greater operating widths can be attained.

It would be conceivable that only a single harvested crop processing arrangement be provided, to which the harvested crop from both harvested crop take-up arrangements is conducted. But preferably a second harvested crop processing arrangement is present, to which harvested crop taken up by the second harvested crop take-up arrangement is conducted. This results in a reduction of the load on the first harvested crop processing arrangement and a further repositioning of the center of gravity of the mass of the harvesting machine towards the rear. An obvious solution is to provide a discharge arrangement for the crop that has been processed, which is used together by both harvested crop processing arrangements.

Although the two harvested crop take-up arrangements and the two harvested crop processing arrangements could be attached to a chassis that is rigid in itself and is provided with steerable rear wheels, as is used in the state of the art, a preferred embodiment of the invention uses a chassis in the form of an articulated steering frame that is known in itself. The first harvested crop take-up arrangement and the first harvested crop processing arrangement are attached to a first (forward) chassis part that is connected with a second (rear) chassis part that can be pivoted about the vertical axis and which, in turn, carries the second harvested crop take-up arrangement and the second harvested crop processing arrangement. Each of the two chassis parts is equipped with wheels or track drives (crawler track laying assemblies) of which at least one part can be driven. In order to steer, the two chassis parts are pivoted relative to each other.

The invention is appropriate for any desired harvesting machine with harvested crop processing arrangements, for example, for combines, balers, cotton harvesters and forage harvesters.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
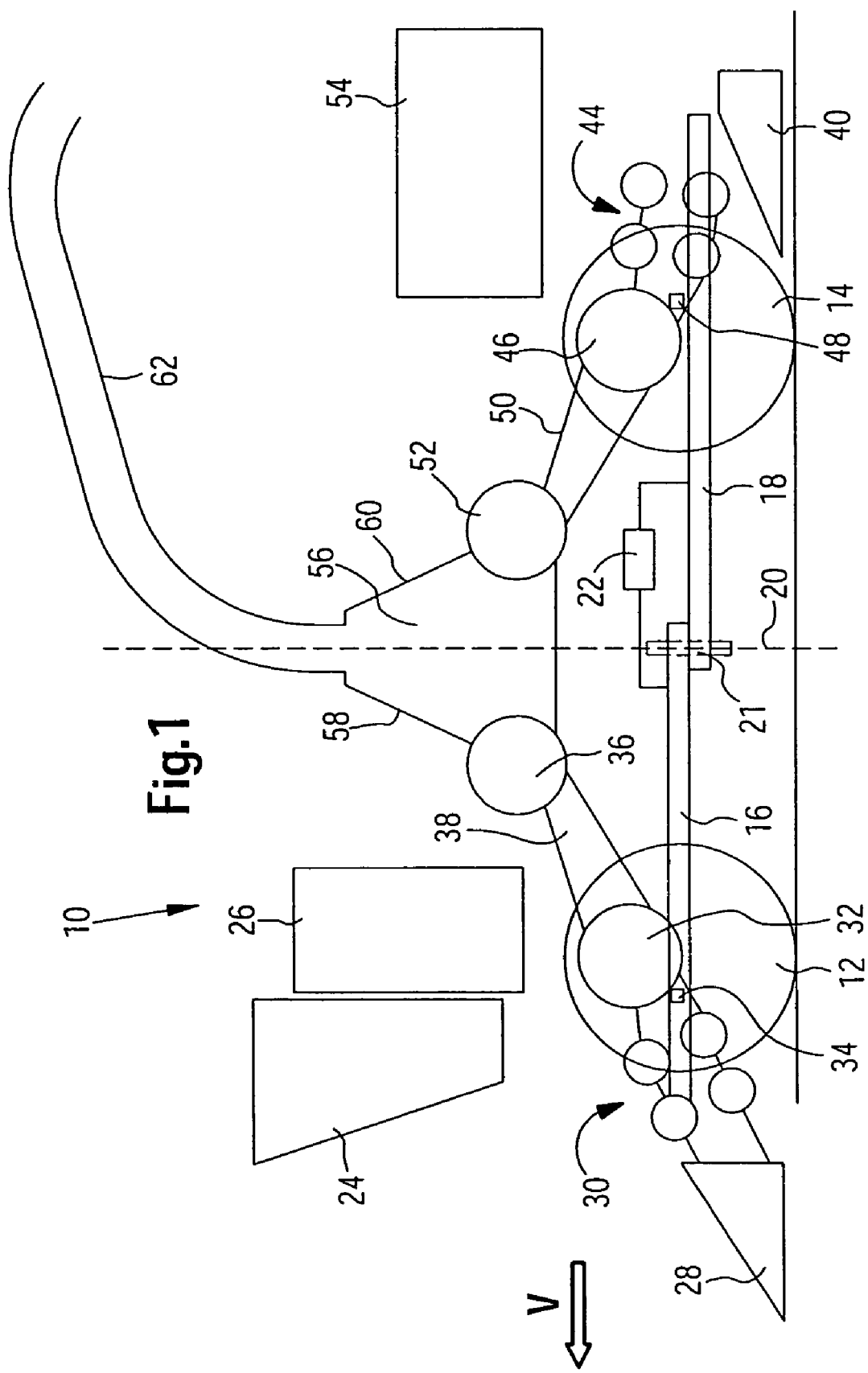
FIG. 1 is a schematic left side view of a harvesting machine constructed in accordance with the present invention in the form of a forage harvester.
Figure 2:
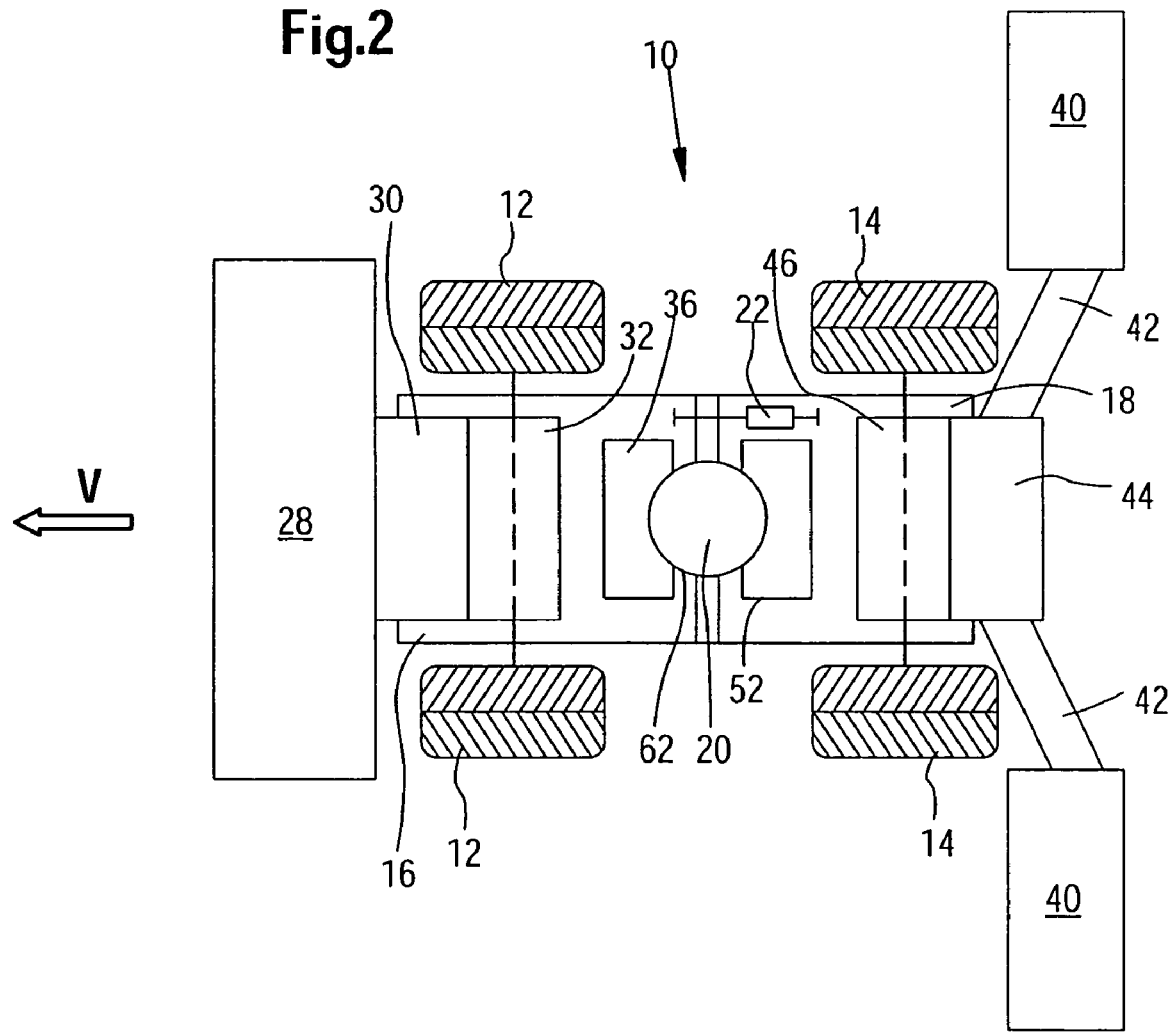
FIG. 2 shows a schematic plan view of the harvesting machine of FIG. 1.

FIGS. 1 and 2 schematically show a harvesting machine 10 in the form of a forage harvester. The harvesting machine 10 is provided with a pair of front wheels 12 and a pair of rear wheels 14 that roll upon the ground. The front wheels 12 are attached rigidly or spring-mounted, but not steerable, to a first chassis part 16, while the rear wheels 14 are also attached rigidly or spring-mounted, but not steerable, to a second chassis part 18. The first chassis part 16 is connected with the second chassis part 18, free to pivot about an axis 20 extending vertically, by a pivot bearing arrangement 21. In order to steer, at least one double-acting hydraulic cylinder 22 (or two single-acting hydraulic cylinders) is, or are, arranged at a spacing from the axis 20 between the first chassis part 16 and the second chassis part 18. Hence the harvesting machine 10 is configured in the form of an articulated steering frame.

At the front of the first chassis part 16, a cab 24 is provided with operating elements for an operator. Behind the cab 24, as considered in the direction of forward operation V, that extends from right to left in the figures, a fuel tank 26 is attached. At the front end of the first chassis part 16, a first harvested crop take-up arrangement 28 is attached centrally that can be removed (and/or folded inward into a transport position). The first harvested crop take-up arrangement 28 can be connected in joints to a first chassis part 16, adjustable in height or pivoted, and can be provided with a definable support force. The first harvested crop take-up arrangement 28 may be, for example, a corn head, a pick-up, or a cutter head. The crop taken up by the first harvested crop take-up arrangement 28, for example, corn or grass, is conducted by a first crop conveying unit 30 in the form of rough pressing rolls to a first harvested crop processing arrangement 32 in the form of a chopper drum. The latter chops the crop into small pieces in interaction with a shearbar 34 and conducts it over a first channel 38 to a first blower 36. In the first channel 38 between the first harvested crop processing arrangement 32 and the first blower 36 a kernel processor (not shown) can be inserted in order to crush the kernels contained in the crop. The first crop conveying unit 30, the first harvested crop processing arrangement 32, the first channel 38 and the first blower 36 are fastened to the first chassis part 16.

At the rear end of the second chassis part 18, also considered relative to the forward direction of operation, is a second harvested crop take-up arrangement 40 attached on each side of the harvesting machine 10, whose configuration fundamentally coincides with the first harvested crop take-up arrangement 28. The second harvested crop take-up arrangements 40, however, in each case, convey the harvested crop inward. For transport on public roads, the second harvested crop take-up arrangements 40 can be pivoted upward into a raised transport position. The crop taken up by the second harvested crop take-up arrangements 40 is conveyed further inward through conveying channel 42 and conducted to a second crop conveying unit 44 in the form of rough pressing rolls, that conveys it again forward and delivers it to a second harvested crop processing arrangement 46 in the form of a chopper drum. The second harvested crop processing arrangement 46 reduces the crop to small pieces in interaction with a shearbar 48 and conducts it over a second channel 50 to a second blower 52. In the second channel 50, a kernel processor (not shown) can also be inserted in order to crush the kernels contained in the crop. The second crop conveying unit 44, the second harvested crop processing arrangement 46, the second channel 50 and the second blower 52 are fastened to the second chassis part 18.

Moreover, the second chassis part 18 carries an internal combustion engine 54, that supplies the driven elements of the harvesting machine 10 with mechanical or electrical energy. The elements of the first chassis part 16 may be driven by means of an articulated shaft and/or other movable means, for example, hydraulic lines, by the internal combustion engine 54. The drive system may also include an internal combustion engine, a generator and electric motors for the drive of the conveying elements and/or the crop processing elements.

Above the pivot bearing arrangement 21, a funnel-shaped duct 56 is arranged in which the blowers 36, 52 blow or throw the crop conducted to them approximately vertically upward. The duct 56 is provided with a front wall 58 that is connected to the first chassis part 16 and a rear wall 60 that is connected to the rear chassis part 18. The walls 58, 60 are supported in bearings so as to rotate upon each other, for example, sliding against each other or by means of a harmonica-type connection in order to be able to absorb the relative pivoting movement of the chassis parts 16, 18 brought about by the steering movement of the hydraulic cylinder 22. A discharge arrangement 62 is attached to the upper side of the duct 56, through which the chopped crop can be loaded onto a trailer or any other desired vehicle. The position of the discharge arrangement 62 (the height of the end, angle of rotation about the axis 20 and the position of a discharge flap arranged at the end) can be repositioned by means of appropriate drives by the operator or automatically. Thereby the discharge arrangement 62 can be rotated about the axis 20.

The result is a harvesting machine 10 with a wide operating width with which a good throughput can be attained at a high quality of cut. The center of gravity of the mass is located approximately in the center of the harvesting machine.

Having described the preferred embodiment, it will become apparent that various modifications can be made without departing from the scope of the invention as defined in the accompanying claims.

What is claimed is:

1. A harvesting machine, comprising: a chassis arrangement supported on front and rear sets of wheels; a first harvested crop take-up arrangement attached to a front location of the harvesting machine; a harvested crop processing arrangement; a front conveyor arrangement coupled between said first harvested crop take-up arrangement and said harvested crop processing arrangement; a second harvested crop take-up arrangement offset to the side of, and spaced to the rear relative to, said first harvested crop take-up arrangement; and a rear conveyor arrangement coupled between said second harvested crop take-up arrangement and said harvested crop processing arrangement so as to convey crop to the latter, wherein said harvested crop processing arrangement includes first and second harvested crop processing units; and said first harvested crop take-up arrangement being coupled to said first harvested crop processing unit by said front conveyor arrangement, and said second harvested crop take-up arrangement being coupled to said second harvested crop processing unit by said rear conveyor arrangement and wherein said chassis arrangement includes first and second chassis parts coupled to each other for pivoting about a vertical axis; said first harvested crop take-up arrangement and said first harvested crop processing unit being mounted to said first chassis part; and said second harvested crop take-up arrangement and said second harvested crop processing unit being mounted to said second chassis part; and said front set of wheels being mounted on said first chassis part and said second said of wheels being mounted on said second chassis part; and a steering arrangement being mounted between said first and second chassis parts to effect steering of said harvesting machine.

2. The harvesting machine, as defined in claim 1, wherein said second harvested crop take-up arrangement includes separate crop take-up units respectively located on opposite sides of said harvesting machine.

3. The harvesting machine, as defined in claim 1, wherein said harvesting machine includes a discharge arrangement; and said first and second conveying arrangements respectively coupling said first and second harvested crop processing units to said discharge arrangement.

4. The harvesting machine, as defined in claim 1, wherein said harvested crop processing arrangement is a chopper arrangement.

\* \* \* \* \*